United States Patent [19]

Vermilye

[11] 4,385,423

[45] May 31, 1983

[54] OVER-CENTER LATCHING COUPLING

[75] Inventor: Michael L. Vermilye, Redmond, Wash.

[73] Assignee: The Boeing Company, Seattle, Wash.

[21] Appl. No.: 218,624

[22] Filed: Dec. 22, 1980

[51] Int. Cl.³ .............................................. A43C 11/00
[52] U.S. Cl. ................... 24/71 T; 24/68 R; 24/68 T; 292/256.69; 292/68
[58] Field of Search ......... 24/241 P, 241 SB, 241 SP, 24/240, 242, 68 BT, 68 R, 68 CD, 68 CT, 68 SK, 68 A, 68 D, 68 T, 69 CT, 69 R, 69 TS, 69 ST, 71 T, 71 CT, 71 ST, 71 R, 71 A, 71 TD, 69 AT, 311, 248 B; 292/256.69, 247, 113, 68, DIG. 49

[56] References Cited

U.S. PATENT DOCUMENTS

| | | | |
|---|---|---|---|
| 1,280,408 | 10/1918 | Cox | 24/68 CT |
| 2,945,274 | 7/1960 | Paterson | 24/68 T |
| 3,238,581 | 3/1966 | Sawyer | 24/71 T |
| 4,051,611 | 10/1977 | Chalmers | 24/68 SK X |
| 4,074,549 | 2/1978 | Yee | 292/247 X |
| 4,318,557 | 3/1982 | Bourne et al. | 292/113 |

*Primary Examiner*—Mickey Yu
*Attorney, Agent, or Firm*—Delbert J. Barnard; Eugene O. Heberer; Joan H. Pauly

[57] ABSTRACT

An over-center latching device for coupling two members by the operation of a handle with the use of one hand. The device has a rod having a T at one end for engaging a hook, the other end of the rod being pivotally engaged intermediate the ends of the handle. One end of the handle is pivotally engaged on a support member adjacent and spaced from the pivot point of the rod. The other end of the handle is adapted to be gripped by the operator for completing the latching and unlatching operation. The support member which is adapted to be secured to a fixed member has a concave cam surface facing the pivoted end of the rod. The pivoted end of the rod has a leaf spring extending therefrom toward the concave cam surface. To engage the latch, the operator grips the handle and rotates it on its pivot so that the leaf spring is moved into engagement with the end of the cam surface. By the contact of the spring on the cam surface the rod is rotated so that the T-bar is moved toward the hook and as the spring is continued to be rotated on the cam the T-bar is rotated into latching engagement with the hook and the center of the rod pivot is moved over the center of the handle pivot to securely latch the rod and hook together to complete the coupling operation. A safety lock is also provided to maintain the coupling in the latched engagement.

13 Claims, 5 Drawing Figures

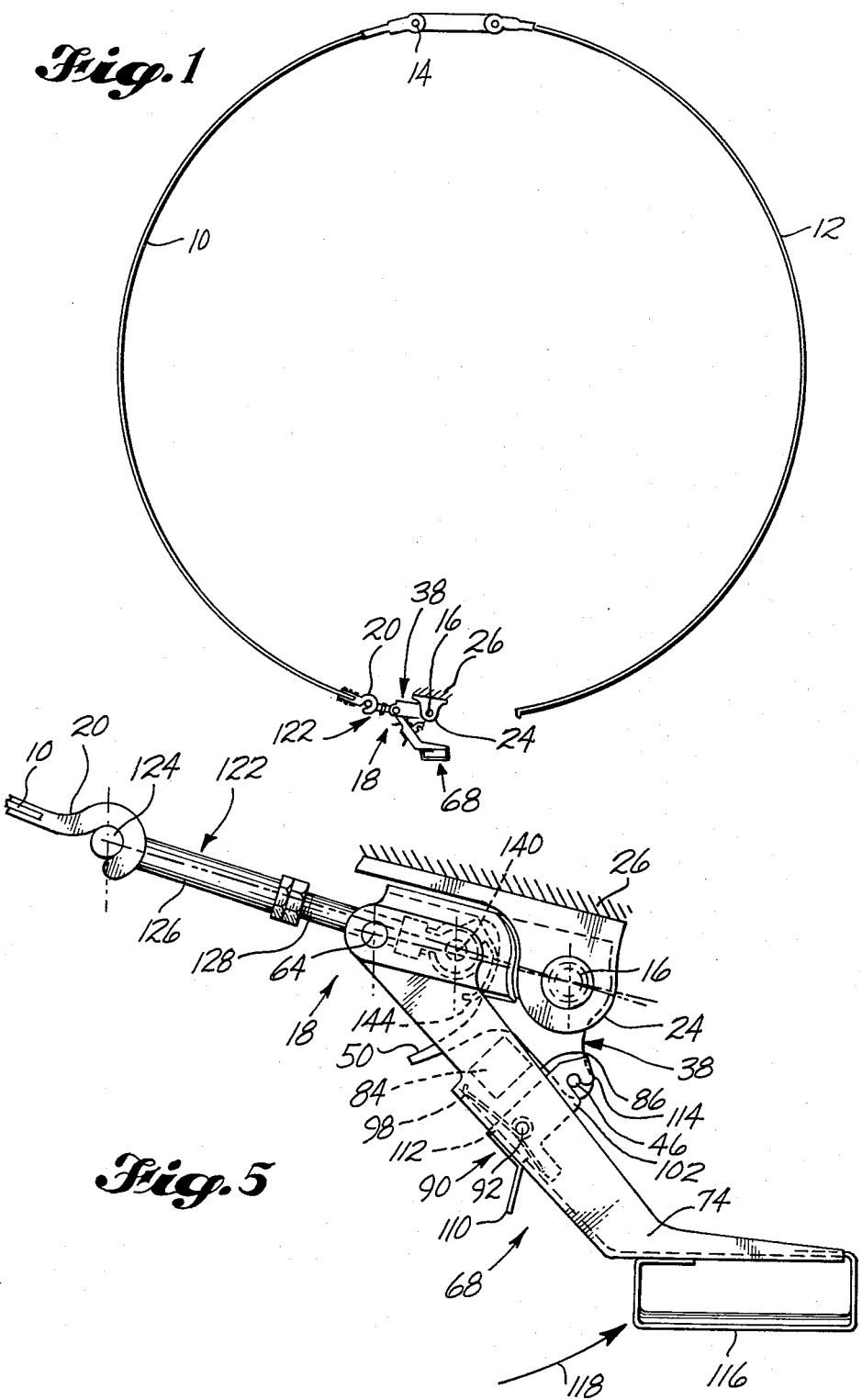

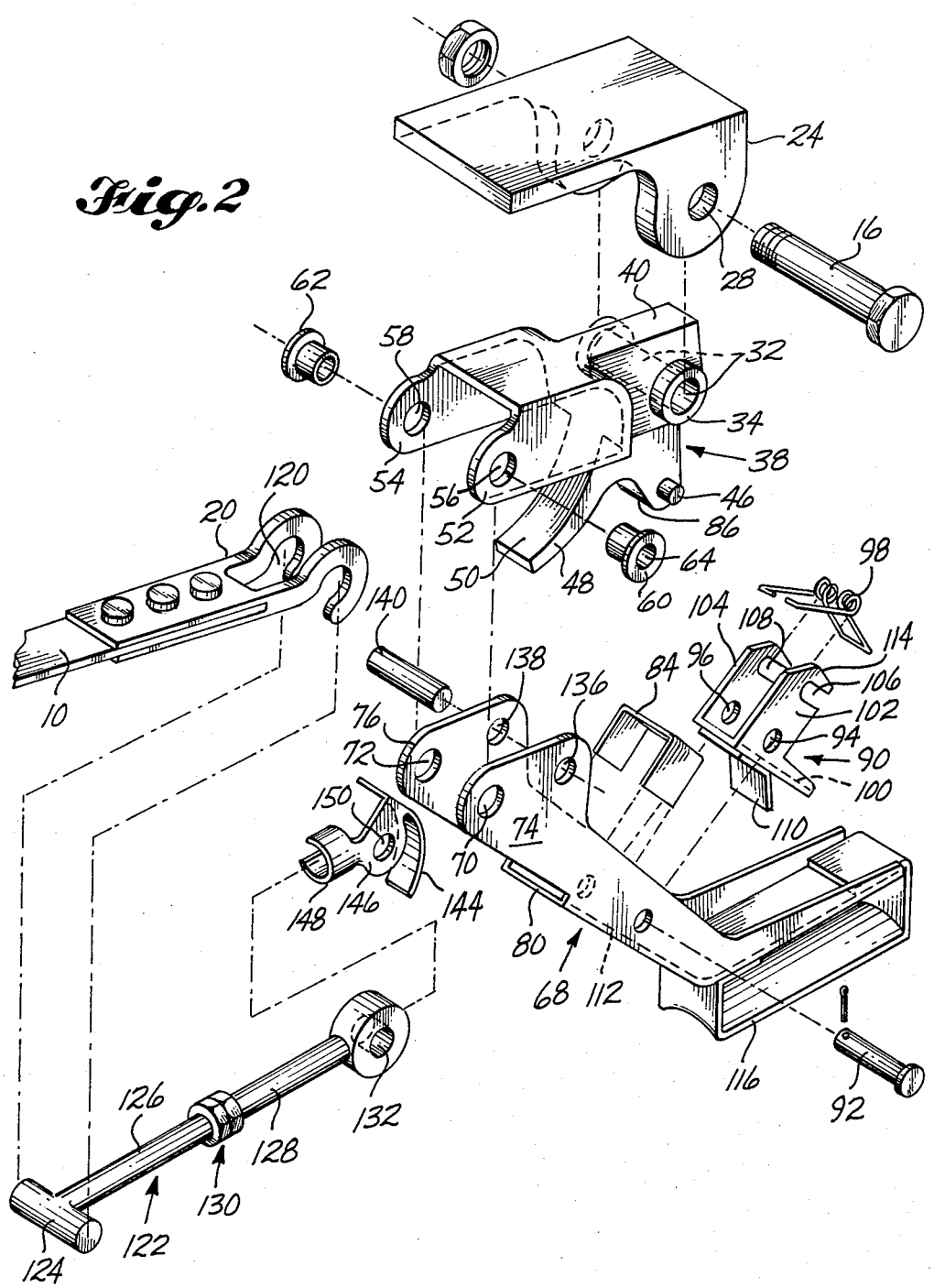

OVER-CENTER LATCHING COUPLING

BACKGROUND OF THE INVENTION

In certain installations where straps are coupled to a fixed member by a latching device, it is difficult or impossible to reach to the area where the latch is coupled to a hook on a strap, for example. In such a situation it is desirable that a latch be provided so that it can be engaged for coupling without manual guidance for the engagement. That is, it is necessary or desirable that the engagement occurs by means of the operation of a handle with one hand and that it occurs as the coupling is being secured by moving the handle into a locking position.

SUMMARY OF THE INVENTION

The present invention is an over-center latching coupling to provide one hand operation in a confined area. For coupling a strap to a fixed member, a T-bar at one end of a latching device is adapted to engage a hook on the end of a strap. The other end of the T-bar is pivotally mounted to a handle intermediate its ends. Spaced from and adjacent the pivot point of the bar on the handle, the handle is pivotally mounted on a support member so that the handle can be moved with one hand to move the center of the bar pivot over the center of the handle pivot.

The pivotal end of the bar has a leaf spring extending therefrom and the handle support has a concave cam which the spring engages as the handle moves the pivoted end of the T-bar toward the support. When the spring makes contact with the cam, the bar is rotated to move the T end adjacent the hook and as the spring is further rotated by the handle the continuing action of the spring on the cam further rotates the bar so that the T-bar moves into engagement with the hook. As the handle is further rotated so that the pivot of the bar is moved over the center of the pivot of the handle, coupling is completed and the latch is securely engaged.

A safety lock is also provided to further secure the latch in its coupled position.

The invention may be employed, for example, to secure 750 cowlings on a large aircraft engine. In a closed position the latch is capable of appying about 3,500 lbs. on a strap to hold such a cowling closed. This load is developed when approximately 35 lbs. is applied at the center of the handle to secure the latch. The latch is adapted to be capable of supporting an ultimate load of approximately 10,000 lbs., for example.

Accordingly, it is an object of the invention to provide an approved coupling latch assembly which permits connecting and disconnecting of a strap assembly to be accomplished without the use of tools or hand guidance to align and engage the two coupled parts together, namely, a T-bolt and a latch hook.

It is another object of the invention to provide a coupling latch assembly that is easily connected and disconnected by the action of one hand on a handle in a confined space.

Further objects and advantages of the invention may be brought out in the following part of the specification wherein small details have been described for the competence of disclosure, without intending to limit the scope of the invention which is set forth in the appended claims.

BRIEF DESCRIPTION OF THE DRAWINGS

Referring to the accompanying drawings, which are for illustrative purposes:

FIG. 1 is an elevational view illustrating the coupling of a strap from one fixed position to another by means of the latch as shown in FIG. 5.

FIG. 2 is an exploded view of the latch illustrating the parts in detail;

FIG. 5 is an elevational view of the coupling latch assembly in the coupled and locked positions.

DESCRIPTION OF THE PREFERRED EMBODIMENT

Figure 4:
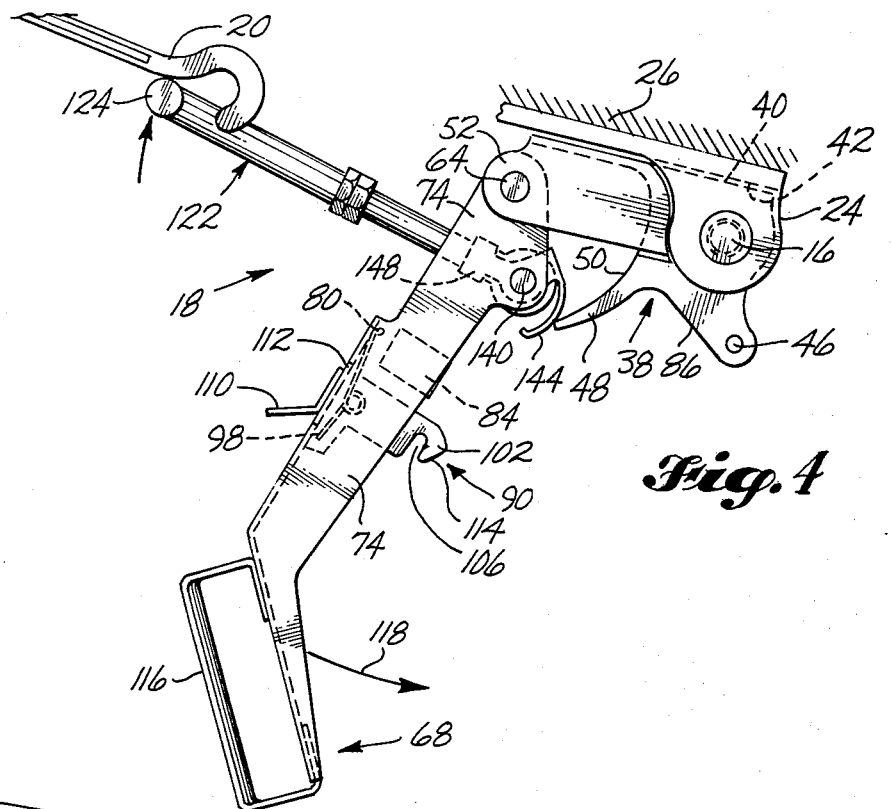
FIG. 4 is an elevational view of the latch as it is being moved into a coupling position by rotation of a handle.

Referring again to the drawings, there is shown in FIG. 1 two tie straps 10 and 12 which are secured on their upper ends to a fixed pivot as 14 and secured on their lower ends to a fixed pivot as 16. Such straps could typically be used to secure a jet aircraft thrust reverser cowling in a closed position. The straps move upwardly when released and are coupled in place by a latching device, generally designated as 18, and a hook 20. The latching device is secured to the fixed pivot 16 and the hook is secured to the strap 10. The pivot 16 extends through a clevis 24, fixably secured to a structural member 26.

The parts of the latching device are shown in detail in FIG. 2 where a bolt forms the pivot 16 extending through aligned clevis holes 28 and through a bore 32, with spacers 34 extending on both sides thereof, in a support member generally designated as 38. The support 38 is rotatable on the pivot bolt 16 but is restricted in rotation by contact of the upper surface 40 on the lower or inner surface 42 of the clevice 24, FIGS. 3 and 4. At a lower end of the support there is a pin 46 extending from both sides of the support for locking the latch in place after it has been securely engaged. Forwardly of the pin 46 is a cam 48 having a generally concave cam surface 50. In the forward end of the support there are two spaced lugs 52 and 54 having aligned bores 56 and 58 therethrough and into which extend two pins 60 and 62 forming a pivot 64.

The pivot pins 60 and 62 pivotally secure a handle, generally designated as 68, to the support member by extending through the holes 70 and 72, respectively, at the upper end of the handle and being fixed therein, of the spaced handle plates 74 and 76, the handle being free to swing on the pivot pins. The plates 74 and 76 extend for the full length of the handle and are secured together by a channel forming member 80.

Figure 3:
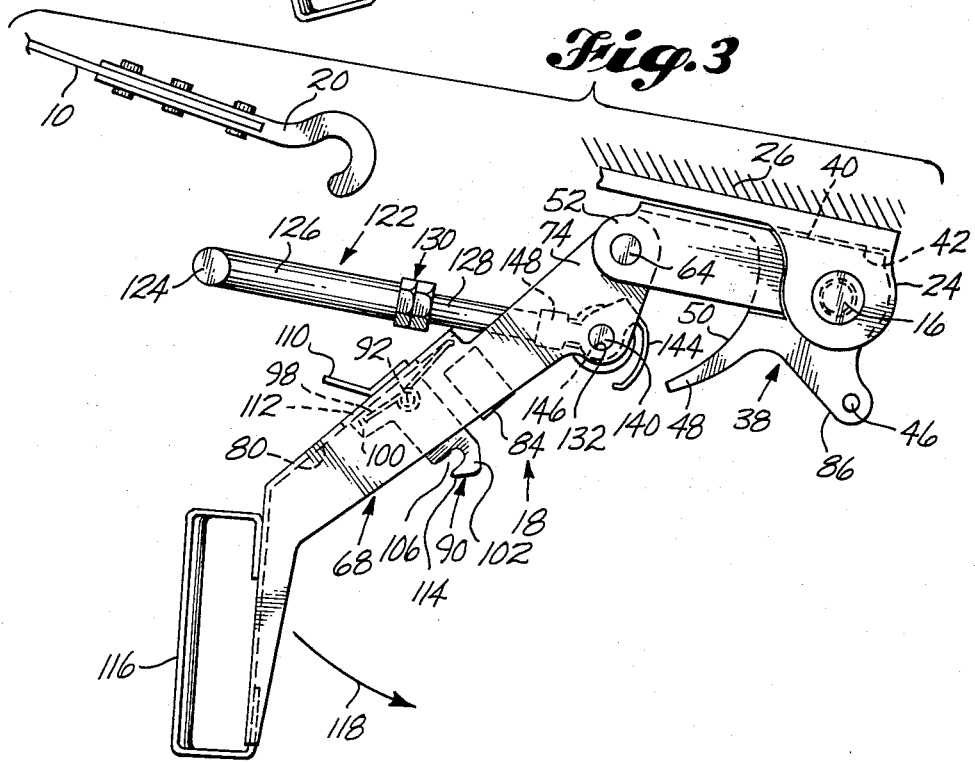
FIG. 3 is an elevational view of a coupling latch assembly in an open position.

Secured within the plates 74 and 76 is a U-shaped stop member 84 to limit rearward or rightward movement in the drawings of the handle against a surface 86 of the support 38, of FIGS. 3 and 5.

Pivotally secured between the handle plates is a generally U-shaped latch locking member, generally designated as 90. The member 90 is secured by a pin 92 extending through the plates and extending through aligned holes 94 and 96, the pin 92 also extending through a double coiled spring 98 which is adapted to hold the member 90 in a locking position. The upper end of the spring abuts the channel bottom 80 between the plates and the lower end of the spring abuts a channel bottom surface 100 of the lock 90 to hold channel legs 102 in a downwardly direction to secure the legs so that slots 106 and 108 are held over the opposite ends of the pin 46 in the locking position, FIGS. 3 and 5. A lever 110 extends through an opening 112 in the channel bottom 80 so that a downward force on the lever pivots the lock 90 so as to raise it off the pin 46 and unlock the latch. The lock is self-locking. As the handle is moved toward the pin and a leg surface 114 engages the pin, the lock is raised and snapped over the pin by the force of the spring 98.

At the lower end of the handle, there is a rectangular gripping device 116 by which an operator opens and closes the latch, the closing occurring in the direction of the arrow 118.

The latching hook 20 is bifurcated at 120, FIG. 2, to receive a latching rod, generally designated as 122 in the form of a T-bolt. The rod has a T-bar 124 and two rod portions 126 and 128, having a length-adjusting nut 130 therebetween. The T-bar 124 is adapted to fit in the hook openings and the bar portion 126 fits in the space 120 between the hooks when latch is engaged, FIG. 5.

At the other end of the hook there is a pivoting eye having a bore 132. The opening 132 is adapted to be pivotally aligned with openings 136 and 138, FIG. 2, in plates 74 and 76 of the handle 68. A pivot pin 140 extends through the openings to secure the rod in the handle. The pivot 140 is adjacent the end of the handle and the pivot 64 but is spaced therefrom a sufficient amount to provide an over-center moment arm between the two pivots.

An approximately one-quarter circle leaf spring 144 extends from a spring clip 146 having a clip portion 148, snap-fit on the rod portion 128 adjacent the opening 132. In addition to the portion 148, the clip is secured to the rod by means of the pin 140 through an opening 150 in the clip.

In FIG. 3 the handle 68 is in a loose hanging position and rod 122 is also hanging on its pivot and in contact with the upper edge of the channel bottom 80 of the handle. When the handle is gripped at 116, and rotated on its pivot 64, in the direction of the arrow 118 toward cam surface 50, the leaf spring 144, FIG. 4, is moved into contact with the lower end of the cam. As pressure is exerted on the spring and the cam, the rod 122 is rotated on its pivot 140 to the position shown in FIG. 4 with the T-bar in abutment with the left end of the hook structure.

As the handle is continued to be moved in the direction of the arrow 118, the spring 144 and pivot 140 are rotated upwardly, the spring engaging the cam surface so as to further rotate the rod 122 and move the T-bar 124 into complete engagement within the hook opening and the rod portion 126 in the space 120 between the bifurcated hooks, FIG. 5. As the handle is continued to be moved on its pivot 64, until the stop 84 makes contact with the surface 86, the center of the pivot 140 is moved over the center of the handle pivot 64, FIG. 5, so as to further compress the spring and to securely engage the T-bar within the hook. The latch is then securely coupled between the fixed clevis 24 and the strap 10.

Because of the spring effect on the cam, close tolerances are not necessary to properly rotate the T-bar into the hook, the engagement into the hook being accomplished without any tool or other manual aid. The rotation of the handle 68 accomplishes the entire engagement.

In addition, as the handle is moved into the position shown in FIG. 5, the surface 114 of the safety lock 90 is moved against the surface of the pin 46, and because of the angle of the surface 114, the lock is raised on its pivot 92 against the force of the spring 98 so that the pin 46 becomes engaged with the slots 106 and 108. The latch assembly is then locked with means in addition to the over-center holding latch arrangement. To release the lock 90, the lever 110 is pushed inwardly against the force of the spring to rotate the lock on its pivot 92 and move the slots 106 and 108 above the pin 146 and so as to disengage the lock.

To open the latching engagement pressure is exerted on the handle in the gripping area at 116 in the opposite direction of the arrow 118 and the pivot 140 is moved so that its center extends below the center of the pivot at 64. The latch then becomes disengaged and the T-bar 124 is permitted to swing away from the hook back into the position as shown in FIG. 3.

The invention and its attendant advantages will be understood from the foregoing description and it will be apparent that various changes may be made in the form, construction, and arrangements of the parts of the invention without departing from the spirit and scope thereof or sacrificing its material advantages, the arrangements hereinbefore described being merely by way of example. I do not wish to be restricted to the specific forms shown or uses mentioned except as defined in the accompanying claims.

What is claimed is:

1. In an over-center latching device,
   a latching member having one end for engaging a second member in a latched position;
   an operating member having one end pivotally engaged with a support member;
   said latching member having its other end pivotally engaged with said operating member for rotation of the other end of the latching member by the operating member toward the support member;
   said other end of said latching member having a leaf spring to be engaged with a concave surface on said support member to rotate said latching member so as to engage said second member during rotation of the latching member by the operating member; and
   said leaf spring and said concave surface being biased together during said rotation of said latching member, the spring being compressed to continue contact with the concave surface as continued rotation moves the center of the latching member pivot on the operating member over the center of the operating member pivot on the support member to secure the one end of the latching member in the latched position.

2. In an over-center latching mechanism,
   hook means for fastening on one end of a member to be secured;
   a rod having one end adapted to be engaged with said hook means;
   a handle having a free gripping end and having its other end pivotally secured to a fixed pivot on a support member;
   the other end of said rod being pivotally engaged with said handle adjacent and spaced from the other end of said handle;
   means on said other end of said rod for engaging means on said support member;

said handle being rotatable on its pivoted other end to move said other end of said rod toward said support member so that said means on said other end of said rod slidably engages said means on said support member;

said means on said other end of said rod when engaged with means on said support member being adapted to rotate said rod so that its one end is moved toward said hook means, and becomes engaged therein as said handle is continued to be rotated to further slidably engage said means on said rod with said means on said support member, said pivotal other end of said rod being rotatable around said pivotal other end of said handle during said further engagement; and said one end of said rod being securely engaged with said hook means when the center of said rod pivot is rotated around and over the center of the pivot on the other end of said handle.

3. The invention according to claim 2 including:

lock means on said handle and on said support member to be automatically engaged to lock said handle to said support member and to lock said one end of said rod in said hook means.

4. The invention according to claim 2 in which:

said hook means are two juxtaposed, aligned, spaced hooks;

said one end of said rod having a T-bar to engage said hooks with said rod therebetween.

5. The invention according to claim 2 in which:

said means on said other end of said rod is a cam follower; and said means on said support member is a cam.

6. The invention according to claim 5 in which:

said cam follower is a leaf spring;

said cam being a concave surface;

said spring being engaged with said concave surface to rotate said rod;

said spring being compressed during said rotation to continue contact with said concave surface during rotation.

7. In an over-center latching device, a latching member having one end for engaging a second member in a latched position;

an operating member having one end pivotally engaged with a support member on a fixed pivot;

said latching member having its other end pivotally engaged with said operating member to rotate the other end of the latching member toward the support member;

said other end of said latching member and said support member each having means to be slidably and removably engaged with each other to guide said latching member so as to engage said second member; and said means to be engaged on said latching and support members being biased together during said rotation of said latching member, as continued rotation thereof moves the center of the latching member pivot on the operating member over the center of the operating member pivot on the support member to secure the one end of the latching member in the latched position.

8. The invention according to claim 7 in which:

said means on the other end of the latching member is a cam follower; and said means on said support member is a cam.

9. The invention according to claim 8 in which:

said cam follower is a leaf spring;

said cam being a concave surface;

said spring being engaged with said concave surface to rotate said latching member;

said spring being compressed during said rotation to continue contact with said concave surface during rotation.

10. In an over-center mechanism, hook means for fastening on one end of a member to be secured;

a rod having one end adapted to be engaged with said hook means;

a handle having a free gripping end and having its other end pivotally secured adjacent one end of a support member;

the other end of said rod being pivotally engaged with said handle adjacent and spaced from the other end of said handle;

a leaf spring on said other end of said rod for engaging a concave surface on said support member;

said handle being rotatable on its pivoted other end to move said other end of said rod toward said support member so that said leaf spring on said other end of said rod engages said concave surface on said support member;

said leaf spring when engaged with said concave surface being adapted to rotate said rod so that its one end is moved toward said hook means, and becomes engaged therein as said handle is continued to be rotated to further engage said leaf spring with said concave surface;

said leaf spring being compressed during said rotation to continue contact with said concave surface during rotation;

said pivotal other end of said rod being rotatable around said pivotal other end of said handle during said further engagement; and said one end of said rod being securely engaged with said hook means when the center of said rod pivot is rotated around and over the center of the pivot on the other end of said handle.

11. The invention according to claim 10 including:

lock means on said handle and on said support member to be engaged to lock said handle to said support member and to lock said one end of said rod in said hook means.

12. The invention according to claim 10 in which:

said support member is adapted to be secured to a fixed member.

13. The invention according to claim 10 in which:

said hook means are two juxtaposed, aligned, spaced hooks; and said one end of said rod having a T-bar to engage said hooks with said rod therebetween.

* * * * *